(12) United States Patent
Etemad

(10) Patent No.: US 8,526,908 B2
(45) Date of Patent: Sep. 3, 2013

(54) METHOD AND APPARATUS FOR CERTIFICATION BASED FEATURE ENABLEMENT

(75) Inventor: Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 12/777,748

(22) Filed: May 11, 2010

(65) Prior Publication Data

US 2011/0281555 A1    Nov. 17, 2011

(51) Int. Cl.
*H04M 11/00*   (2006.01)

(52) U.S. Cl.
USPC ............................................... 455/403

(58) Field of Classification Search
USPC ..................... 455/411, 423–425, 403
See application file for complete search history.

(56) References Cited

U.S. PATENT DOCUMENTS

| | | | | |
|---|---|---|---|---|
| 5,412,375 | A | * | 5/1995 | Wood ........................ 455/451 |
| 7,784,029 | B2 | * | 8/2010 | Hassan et al. ................ 717/120 |
| 2002/0098830 | A1 | * | 7/2002 | Lauper et al. ................. 455/411 |
| 2002/0144134 | A1 | * | 10/2002 | Watanabe et al. ............ 713/191 |
| 2003/0060189 | A1 | * | 3/2003 | Minear et al. ................. 455/411 |
| 2003/0156549 | A1 | * | 8/2003 | Binder et al. ................ 370/252 |
| 2004/0048608 | A1 | * | 3/2004 | Matsuo et al. ................ 455/418 |
| 2005/0272419 | A1 | * | 12/2005 | Matsuo et al. ................ 455/423 |
| 2006/0281440 | A1 | * | 12/2006 | Minear et al. ................ 455/410 |
| 2007/0178843 | A1 | * | 8/2007 | Singh et al. ................ 455/67.11 |
| 2007/0223523 | A1 | * | 9/2007 | Montpetit et al. ........... 370/465 |
| 2007/0270115 | A1 | * | 11/2007 | Kravets ........................ 455/283 |
| 2009/0061845 | A1 | * | 3/2009 | King ............................ 455/423 |
| 2011/0019592 | A1 | * | 1/2011 | Taaghol ....................... 370/259 |
| 2011/0111748 | A1 | * | 5/2011 | Choi ......................... 455/422.1 |

OTHER PUBLICATIONS

[Testing and Certification Technology Trends] WiMAX Forum Open Retail Certification Overview and Status. Choedujeongoe. TTA Journal No. 128. Mar. 2010.*
WiMAX Forum® Network Architecture. WMF-T32-001-R015v01. Nov. 2009.*

* cited by examiner

*Primary Examiner* — Nathan Mitchell
(74) *Attorney, Agent, or Firm* — Schwegman, Lundberg & Woessner, P.A.

(57) ABSTRACT

Embodiments of a system and method for wireless communication are provided. In certain embodiments, an identification number is received from a subscriber station. The identification number is used to retrieve information regarding features supported by the subscriber station from a first database. An indication of features to be enabled for communication with the subscriber station can be provided based on the features supported by the subscriber station.

17 Claims, 8 Drawing Sheets

| FEATURE PACKAGE | R1 (PICS) | R2 (NICS) |
|---|---|---|
| FP1 (HO) | R1.0 | R1.0 |
| FP2 (MIMO) | R1.0 | - |
| FP3 | NA | R1.0 (DHCP) |
| FP4 (FEMTO) | R1.5 | R1.6 |
| FP5 (MBS) | R1.0 | R1.5 |
| FP6 (OTA) | - | R1.5 |
| FP7 (CVS) | R1.5 | R1.6 |
| FP8 (LBS) | R1.5 | R1.5 |
| FP9 (IPV6) | R1.0 | R1.6 |
| FP10 | RPT1 | - |

FIG. 6A

| FEATURE PACKAGE | R1 (PICS) | R2 (NICS) |
| --- | --- | --- |
| FP1 (HO) | R1.0 | R1.0 |
| FP2 (MIMO) | R1.0 | - |
| FP3 | NA | R1.0 (DHCP) |
| FP4 (FEMTO) | R1.5 | R1.6 |
| FP5 (MBS) | R1.0 | R1.5 |
| FP6 (OTA) | - | R1.5 |
| FP7 (CVS) | R1.5 | R1.6 |
| FP8 (LBS) | R1.5 | R1.5 |
| FP9 (IPV6) | R1.0 | R1.6 |
| FP10 | RPT1 | - |

| FEATURE PACKAGE | R1 (PICS) | R2 (NICS) |
|---|---|---|
| FP1 (HO) | R1.0 | R1.0 |
| FP2 (MIMO) | R1.0 | - |
| FP3 | NA | R1.0 (DHCP) |
| FP4 (FEMTO) | R1.5 | R1.6 |
| FP5 (MBS) | R1.0 | R1.5 |
| FP6 (OTA) | - | R1.5 |
| FP7 (CVS) | R1.5 | R1.6 |
| FP8 (LBS) | R1.5 | R1.5 |
| FP9 (IPV6) | R1.0 | R1.6 |
| FP10 | RPT1 | - |

METHOD AND APPARATUS FOR CERTIFICATION BASED FEATURE ENABLEMENT

BACKGROUND

Prior to communication between a subscriber station and an entity on a provider network, it can be advantageous if the provider network entity and the subscriber station are aware of the communication capabilities of one another. In some examples, these communication capabilities can be expressed in terms of features of a communication standard. Once the communication capabilities of each device are known, the subscriber station and the provider network entity can communicate using a common set of communication capabilities.

BRIEF DESCRIPTION OF THE DRAWINGS

FIGS. 6A, 6B, and 6C illustrate examples of progressive feature coverage for features of a system conformance specification.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Conventionally, subscriber stations are distributed by a wireless network provider that has tested a given model of subscriber station for compatibility with the network prior to authorizing the model of subscriber station to operate on the network. The provider can verify the capability of the subscriber station as well as its interoperability with other subscriber stations. After determining that a given model of subscriber station is compatible with the network, the network provider can authorize the model of subscriber station to operate on the network.

It may be advantageous for a network provider to communicate with retail devices that have not been tested by the provider. To enable these retail devices to communicate with the network of a provider, the methods and apparatuses herein provide for a subscriber station that is tested by a third party to determine the features that are supported by the subscriber station. The third party can subject the subscriber station to one or more certification tests. The third party can also provide the provider network with information regarding the certification tests. The subscriber station can then provide an indication of a certification test passed by the subscriber station to the provider network. The provider network can use the information provided by the subscriber station to enable selected features for communication with the subscriber station. The provider network can also broadcast one or more certification test version supported by the provider network.

Figure 1:
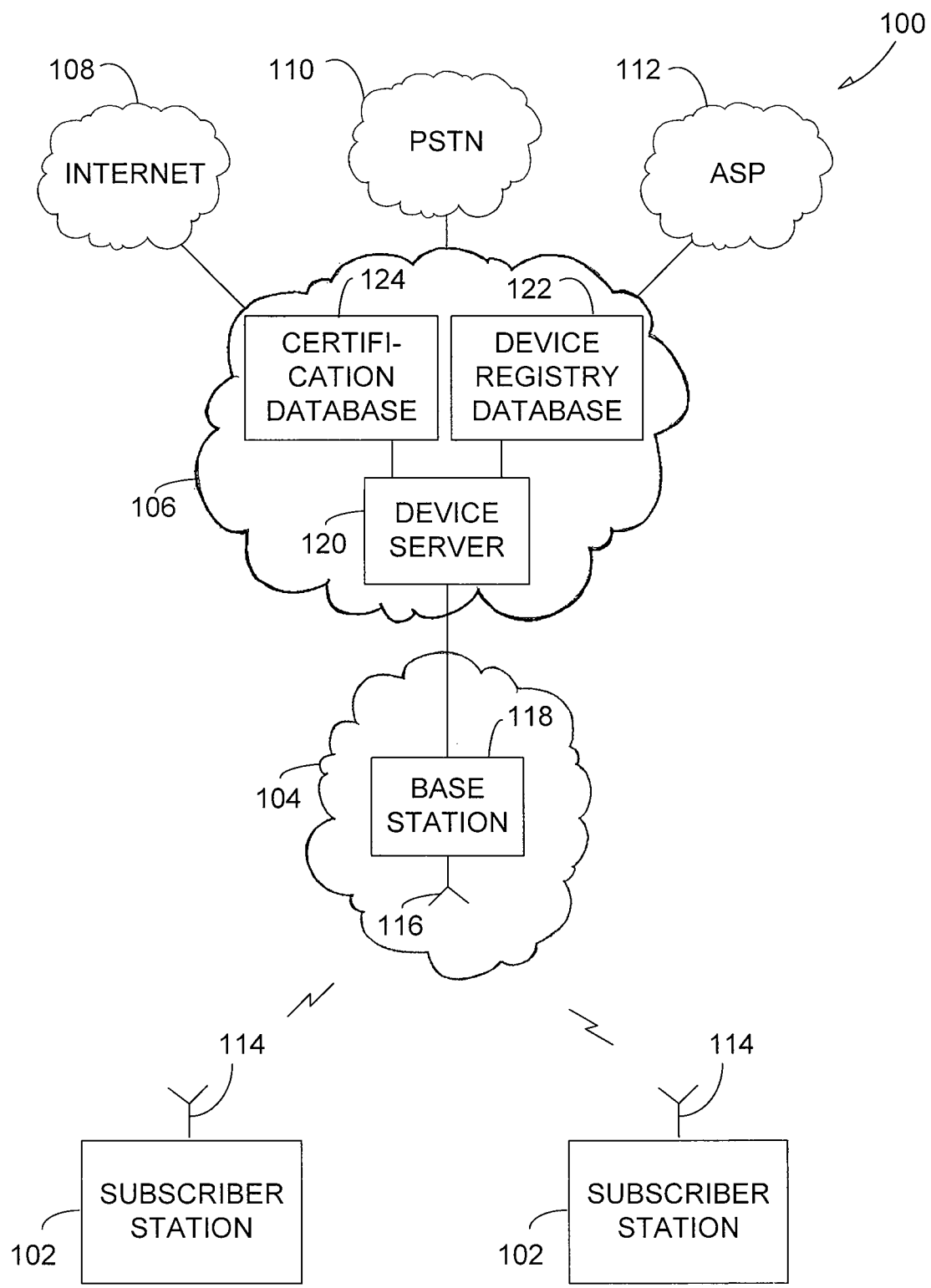
FIG. 1 illustrates an example of a wireless communication system.

FIG. 1 illustrates an example of a wireless communication system 100. The wireless communication system 100 can include a plurality of subscriber stations 102 in wireless communication with an access network 104. The access network 104 forwards information between the subscriber stations 102 and the core network 106. The core network 106 receives information from the subscriber stations 102 sends the information towards the appropriate destination. In an example, the core network 106 can send the information through the internet 108, the public switched telephone network (PSTN) 110, or an application service provider network (ASP) 112. The core network 106 also receives information from the internet 108, PSTN 110, or the ASP 112 and transmits the information to one or more appropriate subscriber stations 102 via the access network 104.

In an example, each subscriber station 102 can include one or more antennas 114 for transmitting and receiving wireless signals to/from one or more antennas 116 in the access network 104. The one or more antennas 116 can be coupled to one or more base stations 118 which are responsible for the air interface to the subscriber stations 102. The one or more base stations 118 are communicatively coupled to one or more device management servers 120 in the core network 106. The one or more device management servers 120 can perform network switching to route information to/from the access network 104, the internet 108, the PSTN 110, and the ASP 112. The one or more device management servers 120 can also perform authentication, authorization, and accounting (AAA) for a provider of the core network 106. In an example, the core network 106 can include a device registry database 122 and a certification database 124 used to determine which communication features to enable for communication with a given subscriber station 102.

Figure 2:
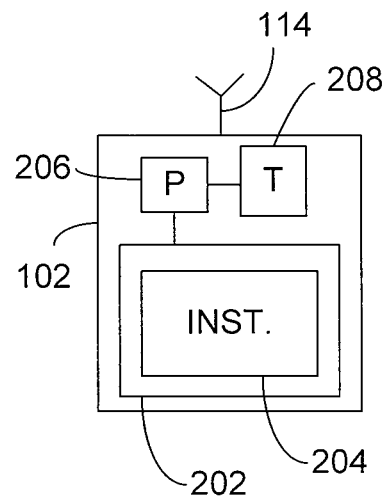
FIG. 2 illustrates an example of a subscriber station for communicating in the wireless communication system of FIG. 1.

FIG. 2 illustrates an example of a subscriber station 102. The subscriber station 102 can include a memory 202 for storage of instructions 204 for execution on processing circuitry 206. The instructions 204 can comprise software configured to cause the subscriber station 102 to perform actions for wireless communication between the subscriber stations 102 and the base station 118. The subscriber station 102 can also include an RF transceiver 208 for transmission and reception of signals coupled to an antenna 114 for radiation and sensing of signals.

In an example, the subscriber station 102 can be configured to operate in accordance with one or more frequency bands and/or standards profiles including a Worldwide Interoperability for Microwave Access (WiMAX) standards profile, a WCDMA standards profile, a 3G HSPA standards profile, and a Long Term Evolution (LTE) standards profile. In some examples, the subscriber station 102 can be configured to communicate in accordance with specific communication standards, such as the Institute of Electrical and Electronics Engineers (IEEE) standards. In particular, the subscriber station 102 can be configured to operate in accordance with one or more versions of the IEEE 802.16 communication standard (also referred to herein as the "802.16 standard") for wireless metropolitan area networks (WMANs) including variations and evolutions thereof. For example, the subscriber station 102 can be configured to communicate using the IEEE 802.16-2004, the IEEE 802.16(e), and/or the 802.16(m) versions of the 802.16 standard. In some examples, the subscriber station 102 can be configured to communicate in accordance with one or more versions of the Universal Terrestrial Radio Access Network (UTRAN) Long Term Evolution (LTE) communication standards, including LTE release 8, LTE release 9, and future releases. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and later versions (releases) thereof.

In some examples, RF transceiver 208 can be configured to transmit and receive orthogonal frequency division multiplexed (OFDM) communication signals which comprise a plurality of orthogonal subcarriers. In some of these multicarrier examples, the subscriber station 102 can be a broadband wireless access (BWA) network communication station, such as a Worldwide Interoperability for Microwave Access (WiMAX) communication station. In other broadband multicarrier examples, the subscriber station 102 can be a 3rd Generation Partnership Project (3GPP) Universal Terrestrial Radio Access Network (UTRAN) Long-Term-Evolution (LTE) communication station. In these broadband multicarrier examples, the subscriber station 102 can be configured to communicate in accordance with an orthogonal frequency division multiple access (OFDMA) technique.

In other examples, the subscriber station 102 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

In some examples, the subscriber station 102 can be a personal digital assistant (PDA), a laptop or desktop computer with wireless communication capability, a web tablet, a net-book, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

Figure 3:
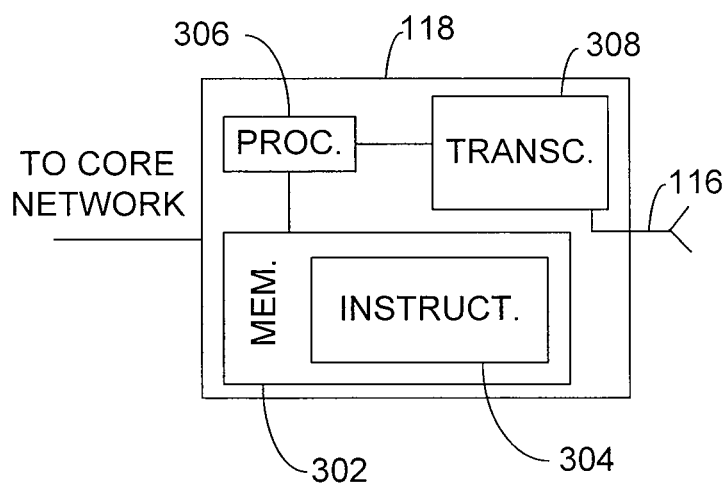
FIG. 3 illustrates an example of a base station for communicating in the wireless communication system of FIG. 1.

FIG. 3 illustrates an example of a base station 118. The base station 118 can include a memory 302 for storage of instructions 304 for execution on processing circuitry 306. The instructions 304 can comprise software configured to cause the base station 118 to perform actions for wireless communication with the subscriber stations 102 and for communication with the core network 108. The base station 118 can also include an RF transceiver 308 for transmission to and from the subscriber stations 102 and an antenna 116 communicatively coupled to the RF transceiver 308. In certain examples, the RF transceiver 308 and the antenna 116 can be housed in the same location as the memory 302 and the processing circuitry 306, and in other examples, the RF transceiver 308 (or portions thereof) and/or antenna 116 can be located remotely from the memory 302 and the processing circuitry 306, such as in a distributed base station.

In some examples, the RF transceiver 308 can be configured to transmit and receive OFDM communication signals which comprise a plurality of orthogonal subcarriers, and, in particular, an OFDMA technique. In other examples, the RF transceiver 308 can be configured to communicate using one or more other modulation techniques such as spread spectrum modulation (e.g., DS-CDMA and/or FH-CDMA), TDM modulation, and/or FDM modulation.

In an example, the base station 118 can be configured to operate in accordance with one or more frequency bands/carriers and/or standards profiles including a WiMAX standards profile, a WCDMA standards profile, a 3G HSPA standards profile, and an LTE standards profile. In some examples, the base station 118 can be configured to communicate in accordance with specific communication standards, such as the IEEE standards. In particular, the base station 118 can be configured to operate in accordance with one or more versions of the 802.16 including variations and evolutions thereof. For example, the base station 118 can be configured to communicate using the IEEE 802.16-2004, the IEEE 802.16(e), and/or the 802.16(m) versions of the 802.16 standard. In some examples, the base station 118 can be configured to communicate in accordance with one or more versions of the UTRAN LTE communication standards, including LTE release 8 and LTE release 9.

Figure 4:
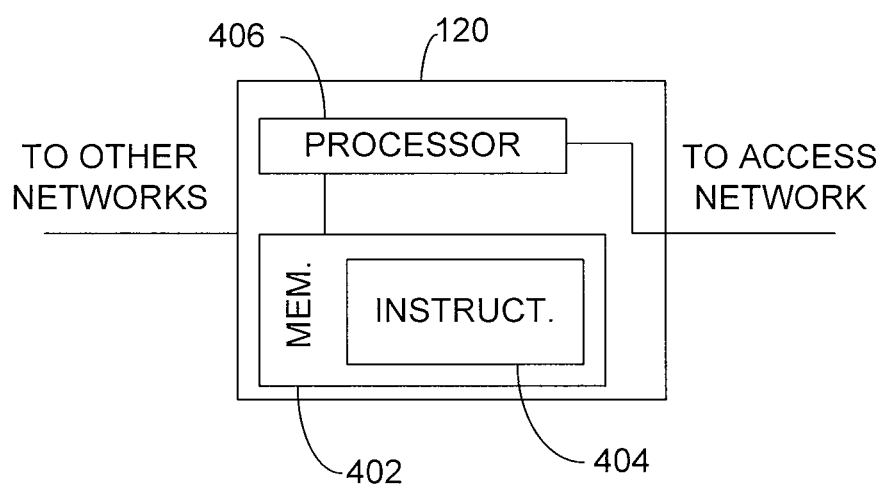
FIG. 4 illustrates an example of device management server for coordinating communication in the wireless communication system of FIG. 1.

FIG. 4 illustrates an example of a device management server 120. The device management server 120 can include a memory 402 for storage of instructions 404 for execution on processing circuitry 406. The instructions 404 can comprise software configured to cause the network server 116 to perform network switching to route information to/from the access network 104, the internet 108, the PSTN 110, and the ASP 112. The instructions 404 can also comprise software configured to cause the network server 104 to perform authentication, authorization, and accounting (AAA) for a provider of the core network 106. In an example, the device management server 120 is coupled to the device registry database 122 and the certification database 124 used to determine which communication features to enable for communication with a given subscriber station 102.

Figure 5:
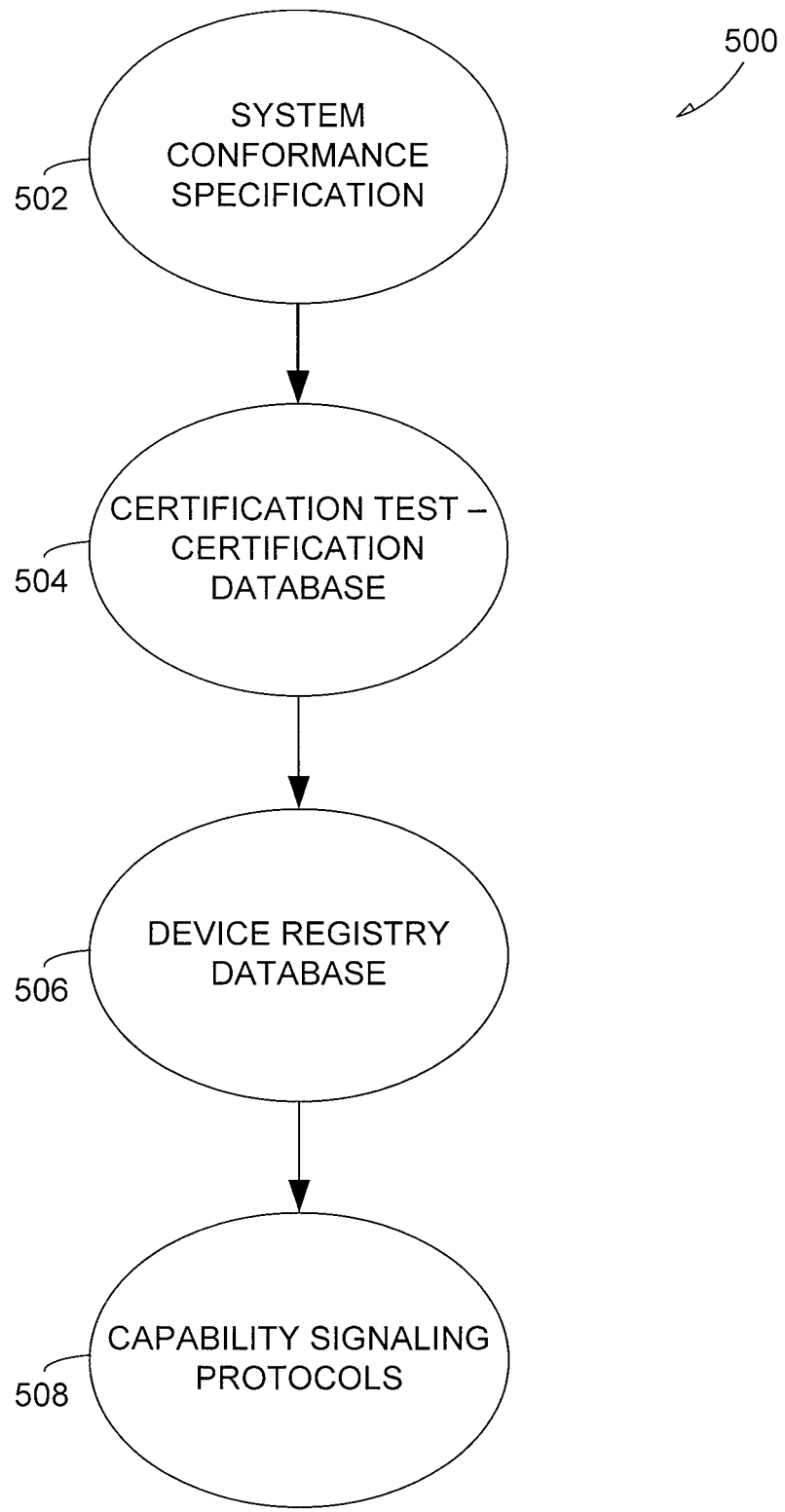
FIG. 5 illustrates an example of a framework for certification based feature enablement.

FIG. 5 illustrates an example of a framework 500 for certification based feature enablement. The framework 500 begins with a system conformance specification 502 which details the possible features that can be supported by a network (e.g., access network 104, core network 106) or a subscriber station 102. A given network (e.g., access network 104, core network 106) can implement the particular features as desired by the provider of the network. In an example, the features of the system conformance specification are divided into feature packages, wherein features within feature packages are implemented as a group. That is, when a feature package is implemented, all of the features of the feature package are implemented. Likewise, when a feature package is not implemented, none of the features of the feature package are implemented.

At 504, a subscriber station 102 is tested by a third party to determine the features that are supported by the subscriber station 102. In an example, the third party comprises a testing body that is affiliated with a communication standard (e.g., a WiMAX forum testing body). In an example, the testing body uses a plurality of different certification tests to determine what features are supported by various subscriber stations 102. Each certification test (also referred to herein as a "version" of the certification test) tests a certain set of features. A subscriber station 102 passes a given version of a certification test when the subscriber station 102 can support all of the features of the version of a certification test. In an example, the certification test, tests whether the subscriber station 102 versus feature packages of the system conformance specification 502.

In an example, the features (or feature packages) tested in each version of the communication standard are provided by the testing body to the network provider. This information can then be stored in the certification database 124. The certification database 124, therefore, can comprise a plurality of versions of certification tests mapped to the features or feature packages tested by that version.

At 506, the testing body provides the subscriber station 102 with a device registration number and provides the network provider with information regarding the subscriber station 102. In an example, the testing body provides the subscriber station 102 with a device registration number once the subscriber station 102 passes a certification test. In an example, when a given model of subscriber station 102 passes a certification test, the device registration number is provided to each subscriber station 102 of that model. In other words, each individual subscriber station 102 does not have to pass the certification test, once the model is determined to support the features (or feature packages) of a given version of a certification test, each subscriber station 102 of that model is considered to support those features.

As mentioned above, along with providing the subscriber station 102 with the device registration number, the testing body provides the network provider with information regarding the subscriber station 102. This information includes the device registration number and the version of the certification test passed by the subscriber station 102. This information can also include attributes for the subscriber station 102 collected by the testing body. In an example, the attributes can include the manufacturer's name of the subscriber station 102, the model number, the device type (e.g., wireless phone), the classes supported, any certified optional features (or feature packages), a software version of the subscriber station 102, a hardware version of the subscriber station 102, and a firmware identification and a uniform resource indicator (URI) to a file having additional information about the subscriber station 102. In an example, the certification test can also test whether the subscriber station 102 supports the optional features (or feature packages) and the information regarding which option features are supported can also be collected. This information can then be provided to the network provider with the device registration number and the version of the certification test passed by the subscriber station 102.

The information provided by the testing body is stored in the device registry database 122. The device registry database 122, therefore, can include a plurality of device registration numbers mapped to a version of a certification test passed by the subscriber station 102 to which the device registration number was provided. The device registration number can also be mapped to the attributes regarding the subscriber station 102 to which the device registration number was provided. The information from the testing body can be provided via a push or a pull based protocol between the testing body and the device registry database 122 and certification database 124.

At 508, once the subscriber station 102 has passed one or more certification tests and information has been provided by the testing body and stored in the device registry database 122, subscriber station 102 can initiate communication with the access network 104. During the communication initiation with the access network 104, the subscriber station 102 provides the access network 104 with the device registration number. The access network 104 in combination with the core network 106 uses the device registration number, the device registry database 122, and the certification database 124 to identify and enable specific features for communication with the subscriber station 102.

Although as shown in the example of FIG. 5, the certification database 124 and the device registry database 122 are located in a centralized location, in other examples, the certification database 124 and the device registry database 122 can be managed in a distributed manner.

FIGS. 6A, 6B, and 6C illustrate examples of progressive feature coverage for features of the system conformance specification 502 over time. The features (or feature packages) of the system conformance specification 502 can be selectively enabled for communication on a per subscriber station 102 basis. Accordingly, the subscriber stations 102 or networks (e.g., access network 104 and core network 106) can initially support a minimal number of the features, and over time support for additional features can be added. As support for features is added to either the networks (e.g., access network 104 and core network 106) or the subscriber stations 102, the additional features can be enabled for communication.

FIGS. 6A, 6B, 6C, illustrate an example of three different versions of a certification test that add feature packages to the certification test as the versions increase. The cross-hatched portions of each of FIGS. 6A, 6B, and 6C illustrate the feature packages that are tested by that given version of the certification test. In this example, R1 refers to a reference point between the subscriber station 102 and the access network 104, and R2 refers to a reference point between the subscriber station 102 and the core network 106. R1.0, R1.5, and R1.6 refer to underlying system conformance specification releases.

The feature packages tested by a given version of the certification test can include a hand-off (HO) protocol, multiple input multiple output (MIMO), dynamic host configuration protocol (DHCP), femtocell, mobile base station (MBS), over the air (OTA), certified version signaling (CVS), location based service (LBS), internet protocol version 6 (IPv6), and others (e.g., FB10). In an example, the features enabled in the evolution of certification grows over time and is communicated periodically by the relevant certification authority as various certification tests and versions defined within a major standard system conformance specification release.

FIG. 6A illustrates an example of a first version 602 of a certification test. In an example, the first version 602 tests whether a subscriber station 102 can support the hand-off protocol and the MIMO feature packages. FIG. 6B illustrates an example of a second version 604 of a certification test. The second version 604 tests for, in addition to the feature packages tested by the first version, support of the OTA, CVS, and FP10 feature packages. FIG. 6C illustrates an example of a third version 606 of a certification test. The third version 606 test for, in addition to the feature packages tested by the second version, support of the LBS and IPv6 feature packages.

In an example, the certification database 124 includes a release number field for an encoded representation of a certification test, a version number field for an encoded representation of the version of the certification test, and a bit map where bits are assigned to feature packages tested by the version of the certification test.

Figure 7:
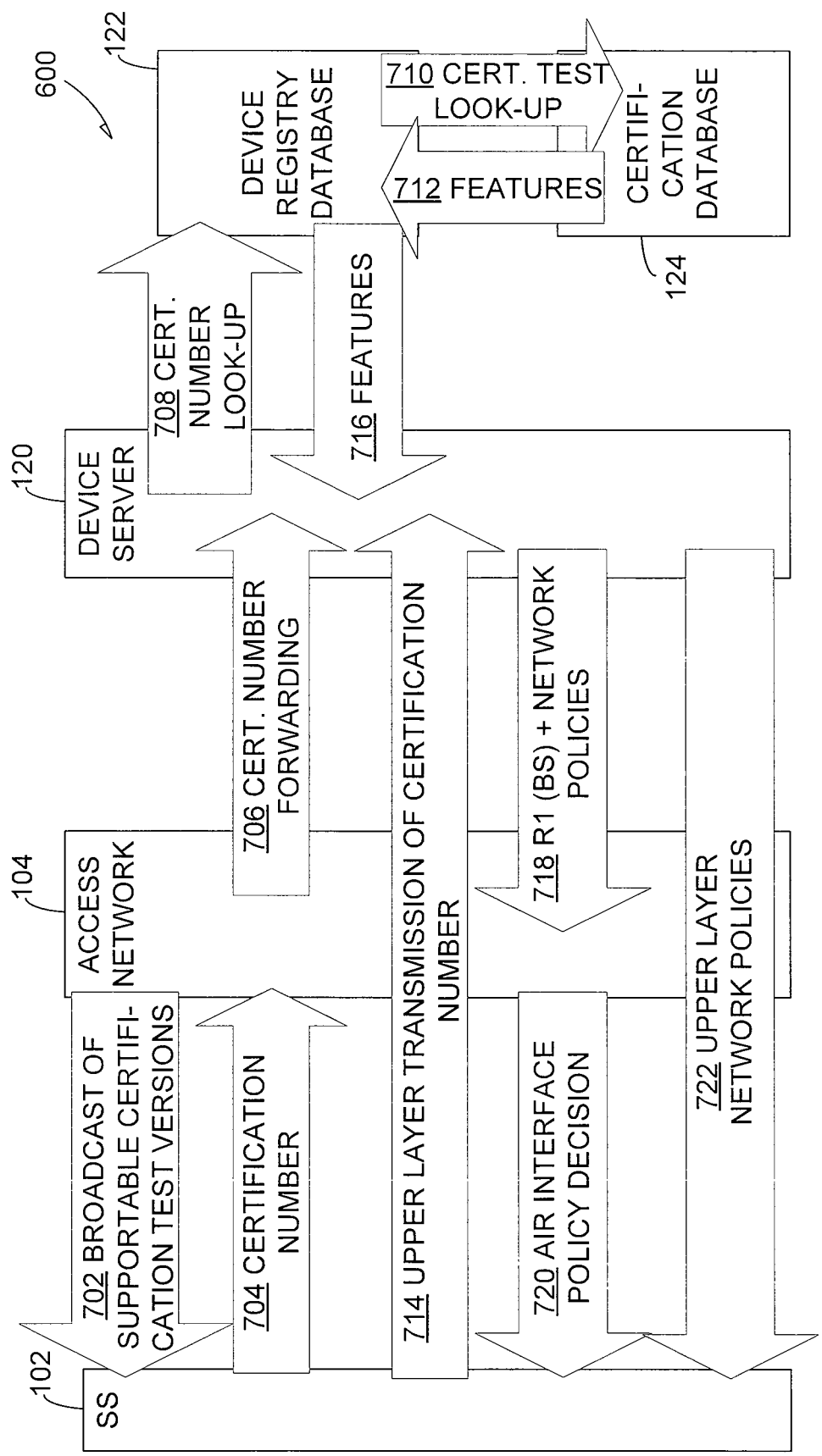
FIG. 7 illustrates an example of the signaling interaction between the subscriber station, the access network, the device management server, the certification database, and the device registry database of the wireless communication system of FIG. 1.

FIG. 7 illustrates an example of the signaling interaction between the subscriber station 102, the access network 104, the device management server 120, the certification database 124, and the device registry database 122. At 702, the access network 104 can broadcast information regarding the certification test versions supported by the access network 104 and core network 106. In an example, this information can be broadcast at layer 2. Prior to initiating communication with the access network 102, a subscriber station 102 can receive the broadcast information and determine whether the subscriber station 102 can support any of the certification test versions supported by the access network 104. If the subscriber station 104 can support at least one certification test version supported by the access network 104, the subscriber station 102 can initiate communication with the access network 102.

Once the subscriber station 104 has determined that it can communicate with the access network 104 and core network 106, the subscriber station 104 can provide an identification number for enablement of features for communication with the subscriber station 102. At 704, one example of the identification number includes a device registration number received from a testing body after passing a certification test as described above. The device registration number can be provided to the access network 104 via a layer 2 transmission. As an example, in IEEE 802.16e this transmission can be done as type-length-value (TLV) in a SBC-REQ message. At 706, the device registration number is forwarded to the device management server 120. At 708, the device management server 120 can use the device registration number to look-up the version of the certification test passed by the subscriber station 102. At 710, the device management server 120 can use the version of the certification test to retrieve features (712) from the certification database 124. In an alternative example, the identification number provided by the version, the device management server 120 can look-up the features of the certification test directly from the certification database 124 without first accessing the device registry database 122. At 714, another alternative example, the identification number (device registration number or version of the certification test) can be provided to the device management server 120 in an upper layer transmission to the device management server 120. As examples, this upper layer transmission can be via exchanges during the authentication process or upon initial exchange with the device management server 120. In an example, the subscriber station 102 can provide the identification number upon initial entry into and/or when the subscriber station 102 is upgraded to support a new version of a certification test. In an example, the subscriber station 102 can provide information regarding legacy versions of a certification test that are supported. In an example, the subscriber station 102 can send an internet protocol (IP) address of a database or web page from which addition information regarding the subscriber station 102 can be retrieved.

At 716, the device management server 120 can retrieve the features supported by the subscriber station 102 including the features from the version of the certification test and the optional features from the device registry database 122. At 718, the device management server 120 can provide the features to enable to the access network 104 via the network policy for the subscriber station 102. In an example, the device management server 120 can determine what feature to enable based on the features supported by the subscriber station 102 and network policies established for the core network 106 and access network 104. These policies can be provided to enforcement points within the network. In an example, when the subscriber station 102 hands-off or is otherwise communicating on another access network, the device management server 120 can keep a context of the subscriber station 102 and pass the network policy for the subscriber station 102 to the other access network or visiting service network in roaming situations. The network policy can indicate a list of enabled features for communication with the subscriber station 102. At 720, the network policies can be communicated from the access network 104 over the air to the subscriber station 102. For example, network policies on air interface features can be translated to layer 2 MAC messages and sent to the subscriber station 102 by the access network 104. In an example, at 722, network policies about network/end-to-end feature packages can be sent to the subscriber station 102 directly from the device management server 120 in authentication or device management protocols. In an example, the subscriber station 102 can be hot-lined to initiate a software/hardware upgrade, if needed, or the subscriber station 102 can be offered limited access to the access network 102 such as, for example, emergency services only. If the subscriber station 102 cannot support a base set of features required by the network policy and cannot be upgraded, the subscriber station 102 may be rejected by the device management server 120.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each standing on its own as a separate embodiment.

What is claimed is:

1. A method for communicating with a subscriber station, the method comprising:
   receiving an identification number from a subscriber station, the identification number including a version number of a certification test passed by the subscriber station, the certification test testing whether the subscriber station supports a package of features;
   retrieving information regarding features supported by the subscriber station from a first database using the identification number; and
   providing an indication of features to be enabled for communication with the subscriber station based on the features supported by the subscriber station.

2. The method of claim 1, wherein the identification number includes a device registration number corresponding to a certification test passed by the subscriber station.

3. The method of claim 1, comprising:
   retrieving a certification test passed by the subscriber station by using a device registry database to map the device registration number to a certification test; and
   wherein retrieving information regarding features supported by the subscriber station includes using the first database to map the certification test to features tested by the certification test, wherein the first database includes a certification test database.

4. The method of claim 1, comprising:
   broadcasting a version of a certification test supported by a network.

5. The method of claim 1, comprising:
enabling one or more feature packages for communication with the subscriber station based on the indication of features to be enabled.

6. The method of claim 5, wherein the one or more feature packages comprise features of an IEEE 802.16 standard.

7. The method of claim 5, wherein the one or more feature packages comprise features of a UTRAN LTE standard.

8. A system operating in a communication network comprising:
at least one processor configured to:
receive a certification number from a subscriber station;
identify a certification test passed by the subscriber station, wherein the certification number corresponds to a certification test and wherein the certification number corresponds to a version of the certification test passed by the subscriber station, the certification test testing whether the subscriber station supports a package of features;
identify communication features supported by the subscriber station based on the communication features tested in the certification test; and
enable a plurality of communication features for communicating with the subscriber station based on the features supported by the subscriber station.

9. The system of claim 8, wherein certification number includes a device registration number corresponding to a certification test passed by the subscriber station.

10. The system of claim 9, wherein the at least one processor is configured to:
map the device registration number to a certification test using a device registry database; and
retrieve information regarding features supported by the subscriber station by using the first database to map the certification test to features tested by the certification test, wherein the first database includes a certification test database.

11. The system of claim 10, wherein the device registry database includes a plurality of device registration numbers mapped to information of a corresponding subscriber station, wherein the information includes a version of a certification test passed by the subscriber station, a model number for the subscriber station, and a device type for the subscriber station.

12. The system of claim 10, wherein the certification test database includes a plurality of certification tests mapped to features tested by the certification test.

13. The system of claim 8, wherein the at least one processor is configured to enable the plurality of features based on a network policy.

14. The system of claim 8, wherein the at least one processor is configured to:
operate in accordance with an IEEE 802.16 standard.

15. The system of claim 8, wherein the at least one processor is configured to:
operate in accordance with a UTRAN LTE standard.

16. A method performed by a subscriber station comprising:
receiving an indication of one or more certification tests supported by a communication network;
determining whether the subscriber station can support at least one of the one or more certification tests;
sending an identification number corresponding to a certification test passed by the subscriber station, the identification number including a version number of the certification test passed by the subscriber station, the certification test testing whether the subscriber station supports a package of features; and
receiving an indication of features to be enabled for communication based on the identification number.

17. The method of claim 16, wherein the identification number includes a device registration number assigned to the subscriber station and linked to a version of a certification test passed by the subscriber station.

* * * * *